3,047,435
RECOVERY OF POLYESTER FILM BASE FROM TERPOLYMER-SUBBED PHOTOGRAPHIC FILM SCRAP
Richard E. Wemple, Rochester, N.Y., assignor to Eastman Kodak Company, Rochester, N.Y., a corporation of New Jersey
No Drawing. Filed Nov. 10, 1958, Ser. No. 772,724
7 Claims. (Cl. 134—2)

This invention relates to a method for reclaiming polyester film scrap, and more particularly to a method for removing substratum from photographic film scrap comprising a polyester film support having a substratum on said support comprising a resinous terpolymer of vinyl chloride or vinylidene chloride.

In the manufacture of photographic film, the usual practice is to coat the film base with one or more thin anchoring substratums, usually less than 0.001-inch thickness, to improve the adhesion of the light-sensitive emulsion layer to the film base. The choice of the substratum depends on the characteristics of the material employed for the film base. For example, with polyester type of film bases, the ordinary mixed gelatin-cellulose nitrate compositions show poor adhesion, whereas certain terpolymers of vinyl chloride or vinylidene chloride together with an acid such as itaconic, acrylic or methacrylic acids, have been found to give excellent adherence to the polyester film bases. A considerable amount of scrap film accumulates in the course of manufacture and use so that the recovery of such scrap films is a desirable objective. While in the recovery of photographic film scrap the emulsion layer can be readily removed, for example, by treating with hot water, the subsequent removal of the substratum presents a much more difficult problem, especially in the case of polyester films wherein a relatively highly hydrophobic terpolymer substratum such as above mentioned is employed. Even small amounts of residual terpolymer substratum interfere with the subsequent use of the treated scrap film, for example, as in the recovery of terephthalic acid from polyesters of aliphatic glycols and terephthalic acid. In this recovery the polyester scrap is saponified with aqueous caustic alkali at elevated temperatures and under pressure conditions, for example, in the proportions of at least two moles of aqueous sodium hydroxide for each mole of the polyester at 155° C. in an autoclave at 80 p.s.i., until completely saponified, followed by filtration and acidification, whereupon the terephthalic acid is precipitated out of solution and collected and washed on a filter and dried. In the absence of impurities, the terephthalic acid obtained is a creamy white solid. However, the terpolymer compositions are sensitive to heat losing hydrogen chloride and darkening at temperatures as low as 220° F. Prolonged treating at higher temperatures results in some carbonization. Consequently, the polyester scrap employed in the above described process must be as free as possible of the terpolymer substratum to prevent the terephthalic acid from becoming darkly colored by the decomposition products of the terpolymer. Such contaminated terephthalic acid cannot be reused for prepreparing colorless polyesters and high quality photograph films therefrom.

I have now found that polyester film scrap and more especially polyethylene terephthalate photographic film scrap, having a substratum consisting of (1) at least 35% by weight of vinyl chloride or vinylidene chloride or mixtures thereof, (2) an alkyl acrylate or methacrylate having from 1–18 carbon atoms in the alkyl group, e.g. methyl acrylate, butyl acrylate, ethyl methacrylate, octadecyl methacrylate, etc., and (3) an acid such as itaconic, acrylic or methacrylic acid, the three components making a total of 100%, can be efficiently and effectively freed from the said substratum by successive treatments with relatively dilute aqueuos solutions of caustic alkali, an oxidizing agent such as an alkali metal peroxide e.g. sodium peroxide, an alkali metal dichromate such as acid potassium dichromate, etc., but preferably an alkali metal permanganate such as sodium or potassium permanganates containing acid or alkali, and sodium bisulfite, and that the film scrap so treated on complete saponification by the previously mentioned process gives a white precipitate of terephthalic acid which can be employed without further costly purification steps for the preparation of polyesters.

It is, accordingly, an object of the invention to provide an efficient and effective process for removing terpolymer substratums from polyester photographic films and scraps thereof. Another object is to provide a process for reclaiming polyester film support that is colorless and substantially free from such substratum. Other objects will become apparent hereinafter.

In accordance with the invention, I treat polyester film scrap, such as polyethylene terephthalate film scrap, having a terpolymer substratum thereon first with an aqueous caustic alkali such as a sodium or potassium hydroxide solution which softens the terpolymer substratum and degrades and separates gelatin emulsion when present, then with an aqueous acidic or alkaline oxidizing reagent such as potassium permanganate solution which removes the substratum from the polyester support, and finally with an aqueous sodium bisulfite solution to discharge any deposit of $MnO_2$ or other manganese salts formed on the support. Advantageously, a water rinse can be employed after each of the above described treatment steps. Also, when acid potassium permanganate solution is employed, this step can advantageously be followed first with treatment with aqueous caustic alkali and then with sodium bisulfite solution. While the steps of the process can be carried out over a relatively wide temperature range, the best results are obtained at about from 150°–220° F., but preferably about 190–195° F., for the treatment with the caustic alkali and the oxidizing solutions, and at about 110°–130° F., for the treatment with the sodium bisulfite solution. Normal atmospheric pressures are preferred, but the process can also be satisfactorily operated at pressures above atmospheric. The concentration of the caustic alkali solutions can range from 0.10–1.0% by weight of caustic alkali; the oxidizing reagent solutions, e.g. from 0.05–0.5% by weight of potassium permanganate and from 0.1–1.0% by weight of either an alkali metal hydroxide or a strong mineral acid such as hydrochloric, nitric, phosphoric, etc., but preferably sulfuric acid; and the sodium bisulfite solutions from 0.1–0.5% of sodium bisulfite or equivalent thereof such as sodium or potassium metabisulfite. The time required to complete each step of the process depends primarily on the temperature employed. For the preferred temperatures, the treatment with caustic alkali solution can be as little as 15 minutes or extended to 1 hour or more, as desired, while for the treatment with the oxidizing reagents such as potassium permanganate a period of from 1–2 hours is required. The sodium bisulfite solution readily discharges any manganese salts deposited on the support in a period of from 15–45 minutes. The ratio of the treating solutions to the film scrap to be treated can vary over a wide range, but preferably for each solution from a ratio of 5:1 to 50:1.

Typical photographic scrap films that can be effectively treated by the above described process of the invention include those having the said terpolymer substratum on a linear polyester film support material such as a highly polymeric linear ester including oriented and heat set polyesters derived from bifunctional aromatic carboxylic acids such as terephthalic acid, 4,4'-sulfonyldibenzoic acid, trans-1,4-cyclohexanedicarboxylic acid, etc., condensed with glycols of the series HO—$C_nH_{2n}$—OH, wherein $n$ is a whole number from 2–10, such as ethylene glycol, 1,5-pentanediol, 2,2-dimethyl-1,3-propanediol, and other dihydroxy compounds such as cis or trans 1,4-cyclohexanedimethanol. Methods for preparing such polyesters are described in Whinfield et al., U.S. Patent 2,465,319, in Caldwell U.S. Patent 2,720,506, and in copending Bell et al. application Serial No. 554,639, filed December 22, 1955. Typical terpolymer substratums consist of from 35–96% by weight of vinylidene chloride or vinyl chloride, or mixtures thereof, from 3.5–40% by weight of an alkyl acrylate or methacrylate such as previously defined, and from 0.5–25% by weight of an acid such as previously defined, but preferably from 60–94%, 5–35% and 1–5% of the said components, respectively. Methods for preparing photographic films from such polyesters and terpolymers are described in Alles et al., U.S. Patent 2,627,088 and Swindells, U.S. Patent 2,698,235.

The following examples will serve to illustrate further the manner of practicing the invention.

*Example 1*

50 g. of film scrap comprising a support of polyethylene terephthalate, a relatively thin substratum of a resinous terpolymer of 90% by weight of vinylidene chloride, 8% by weight of methyl acrylate and 2% by weight of itaconic acid, and an ordinary gelatino-silver halide emulsion layer over the substratum layer was treated by successive steps as follows:

(1) The above film scrap was agitated for 15 minutes at 195° F. with 2000 g. of 0.25% aqueous sodium hydroxide solution to separate and degrade the gelatin emulsion, followed by draining off the liquid.

(2) Next the scrap was rinsed with warm water, to remove the emulsion.

(3) Then the scrap was agitated for 90 minutes at 195° F. with 2000 g. of aqueous 0.5% sodium hydroxide-0.11% potassium permanganate solution to separate and degenerate the terpolymer substratum, after which the liquid was drained off.

(4) Next the above treated scrap was agitated for 30 minutes at 120° F. with 2000 g. of aqueous 0.22% sodium bisulfite solution to remove any unused potassium permanganate and any manganese salts deposited on the film scrap during the treatment. The liquid was drained off.

(5) The resulting scrap film base was then washed with water and dried, and found to be substantially free of terpolymer substratum.

On complete saponification of the above reclaimed scrap film base with strong caustic alkali at elevated temperatures and pressures, followed by filtration and acidification of the reaction mixture, a white precipitate of terephthalic acid was obtained. This was converted to the dimethyl ester and condensed with ethylene glycol to give a substantially colorless, high molecular weight polyethylene terephthalate which on melt extrusion gave clear, colorless sheets that were useful for the preparation of photographic films.

*Example 2*

50 g. of polyethylene terephthalate film scrap having a substratum layer of terpolymer as described in Example 1, but non-emulsion coated, was treated by successive steps as follows:

(1) The above film scrap was agitated for one hour at 195° F. with 2000 g. of 0.5% aqueous sodium hydroxide solution, followed by draining off the liquid.

(2) Next the scrap was agitated for 90 minutes at 195° F. with 2000 g. of aqueous 0.22% sulfuric acid-0.11% potassium permanganate solution, after which the liquid was drained off.

(3) Then the scrap was agitated for one hour at 195° F. with 2000 g. of 0.5% sodium hydroxide, followed by draining off the liquid.

(4) Next the above treated scrap was agitated for 30 minutes at 120° F. with 2000 g. of 0.22% sodium bisulfite solution. The liquid was then drained off.

(5) The resulting scrap film base was then washed with water and dried, and found to be substantially free of terpolymer substratum.

On complete saponification of the above reclaimed scrap film as described in Example 1, a white terephthalic acid was isolated that was useful as an intermediate for the preparation of high quality polyesters and clear colorless and tough films therefrom.

In place of the potassium permanganate in the above examples, there may be substituted a like amount of any other suitable oxidizing reagent, for example, sodium permanganate, sodium peroxide, potassium dichromate, etc. to give generally similar reclaimed polyester scrap film base that is substantially free from terpolymer substratum. Also, the concentrations of the reagents and time for the treatment steps may be varied within the previously mentioned limits. The polyethylene terephthalate can likewise be replaced with any other of the mentioned polyester film materials.

The invention has been described in detail with particular reference to preferred embodiments thereof, but it will be understood that variations and modifications can be effected within the spirit and scope of the invention as described hereinabove and as defined in the appended claims.

What I claim is:

1. A process for recovering film base from photographic film scrap having a highly polymeric linear polyester of a bifunctional aromatic carboxylic acid selected from the group consisting of terephthalic acid, 4,4'-sulfonyldibenzoic acid and trans-1,4-cyclohexanedicarboxylic acid and a dihydroxy compound selected from the group consisting of a glycol having the general formula:

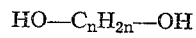

HO—$C_nH_{2n}$—OH wherein $n$ is a whole number of from 2–10, and 1,4-cyclohexanedimethanol as the base material and as a substratum thereon a resinous terpolymer of from 35–96% by weight of a compound selected from the group consisting of vinyl chloride and vinylidene chloride, from 3.5–40% by weight of a compound selected from the group consisting of an alkyl acrylate, an alkyl methacrylate and acrylonitrile, wherein in each instance the said alkyl group contains from 1–18 carbon atoms, and from 0.5–25% by weight of a compound selected from the group consisting of itaconic acid, acrylic acid and methacrylic acid, which comprises the successive steps of treating the scrap first with (1) an aqueous solution of a caustic alkali containing from 0.1–1.0% by weight of said caustic alkali, based on the weight of the said solution at 150°–220° F. for a time sufficient to soften the said substratum and then with (2) an aqueous oxidizing solution containing from 0.05–0.5% by weight, based on the weight of oxidizing solution, of a compound selected from the group consisting of an alkali metal permanganate, an alkali metal peroxide and an alkali metal dichromate, at from 150°–220° F., until the said substratum loosens and separates from the said base material.

2. A process for recovering film base from photographic film scrap having a highly polymeric polyethylene terephthalate as the base material and as a substratum therein a resinous terpolymer of from 35–96% by weight of vinylidene chloride, from 3.5–40% by weight of methyl acrylate and from 0.5–25% by weight of itaconic acid, which comprises the successive steps of agitating the scrap with (1) an aqueous solution of caustic soda containing from 0.1–1.0% by weight of said caustic soda, based on the weight of the said solution, at from 150°–220° F., for a time sufficient to soften the said substratum, with (2) an aqueous oxidizing solution containing from 0.05–0.5% by weight of potassium permanganate and from 0.1–1.0% by weight of caustic soda based on the weight of the said solution, at from 150°–220° F., until the said substratum loosens and separates from the said base material, with (3) an aqueous solution of sodium bisulfite containing from 0.1–0.5% by weight of said bisulfite, based on the weight of the said solution, at from 110°–130° F., until the manganese salts adhering to the resultant base are completely discharged, whereby the said base material is obtained substantially free of the said resinous terpolymer substratum.

3. The process of claim 2 wherein the said photographic film scrap also contains a coating of a gelatino-silver halide emulsion over the said substratum.

4. The process of claim 2 wherein the ratio of said solutions (1), (2) and (3) to scrap in each instance is from 5:1 to 50:1.

5. A process for recovering film base material from photographic film scrap having a highly polymeric polyethylene terephthalate as the base material and as a substratum thereon a resinous terpolymer of from 35–96% by weight of vinylidene chloride from 3.5–40% by weight of methyl acrylate and from 0.5–25% by weight of itaconic acid, which comprises the successive steps of agitating the scrap with (1) an aqueous solution of caustic soda containing fro 0.1–1.0% by weight of said caustic soda, based on the weight of said solution, at 150°–220° F., for a time sufficient to soften the said substratum, with (2) an aqueous oxidizing solution containing from 0.05–0.5% by weight of potassium permanganate and from 0.1–1.0% by weight of sulfuric acid based on the weight of said solution, at from 150°–220° F., until the said substratum loosens and separates from the said base material, with (3) an aqueous solution of caustic soda containing from 0.1–1.0% by weight of said caustic soda, based on the weight of said solution, at 150°–220° F., until the said separated substratum is degraded, and with (4) an aqueous solution of sodium bisulfite containing 0.1–0.5% by weight of said bisulfite, based on the weight of said solution, at from 110°–130° F., until the manganese salts adhering to the resultant base are completely discharged, whereby the said base material is obtained substantially free from the said resinous terpolymer substratum.

6. The process of claim 5 wherein the said photographic film scrap also contains a coating of a gelatino-silver halide emulsion over the said substratum.

7. The process of claim 5 wherein the ratio of said solutions (1), (2), (3) and (4) to scrap in each instance is from 5:1 to 50:1.

References Cited in the file of this patent
UNITED STATES PATENTS

| | | |
|---|---|---|
| 2,627,088 | Alles et al. | Feb. 3, 1953 |
| 2,850,411 | Bratring | Sept. 2, 1958 |

OTHER REFERENCES

Jackson: Journal of the Society of Chem. Ind., vol. 68, pages 247–250, August 1949.